(12) United States Patent
Masuda et al.

(10) Patent No.: US 8,857,158 B2
(45) Date of Patent: Oct. 14, 2014

(54) AFTERTREATMENT SYSTEM AND CONTROL STRATEGY FOR INTERNAL COMBUSTION ENGINE

(75) Inventors: Tomotsugu Masuda, Tokyo (JP); Ko Takayanagi, Tokyo (JP); Keisuke Okuda, Tokyo (JP); Kazuki Nishizawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 185 days.

(21) Appl. No.: 13/512,609

(22) PCT Filed: Jun. 11, 2010

(86) PCT No.: PCT/JP2010/059936
§ 371 (c)(1),
(2), (4) Date: Jun. 22, 2012

(87) PCT Pub. No.: WO2011/092873
PCT Pub. Date: Aug. 4, 2011

(65) Prior Publication Data
US 2012/0260633 A1    Oct. 18, 2012

(30) Foreign Application Priority Data

Jan. 28, 2010    (JP) ................. 2010-016704

(51) Int. Cl.
| | |
|---|---|
| *F01N 3/00* | (2006.01) |
| *F01N 3/023* | (2006.01) |
| *F01N 3/035* | (2006.01) |
| *F02B 29/04* | (2006.01) |
| *F02D 41/02* | (2006.01) |
| *F02D 41/00* | (2006.01) |
| *F02D 41/40* | (2006.01) |
| *F02D 9/04* | (2006.01) |
| *F02M 25/07* | (2006.01) |

(52) U.S. Cl.
CPC ............. *F01N 3/035* (2013.01); *F01N 3/0235* (2013.01); *F02B 29/0406* (2013.01); *F02D 41/029* (2013.01); *F02D 41/025* (2013.01); *F02D 2041/0022* (2013.01); *F02D 41/405* (2013.01); *Y02T 10/42* (2013.01); *F02D 2200/0812* (2013.01); *F02D 9/04* (2013.01); *F02D 2041/0265* (2013.01); *F02M 25/0713* (2013.01); *F02D 41/0235* (2013.01); *F02D 41/0002* (2013.01); *F02M 25/0707* (2013.01); *F02M 25/0727* (2013.01); *F02D 2200/0802* (2013.01)
USPC ................. 60/285; 60/274; 60/311

(58) Field of Classification Search
USPC .................................................. 60/274–324
See application file for complete search history.

(56) References Cited

U.S. PATENT DOCUMENTS 6,978,602 B2 * 12/2005 Ohtake et al. .................. 60/295
2002/0157386 A1 * 10/2002 Hiranuma et al. .............. 60/295
(Continued)

FOREIGN PATENT DOCUMENTS

| EP | 1 650 414 | 4/2006 |
|---|---|---|
| JP | 2003-27921 | 1/2003 |

(Continued)

OTHER PUBLICATIONS

International Preliminary Report on Patentability and Written Opinion of the International Searching Authority issued Sep. 18, 2012 in corresponding International Application No. PCT/JP2010/059936 (with English translation).

(Continued)

*Primary Examiner* — Jesse Bogue
(74) *Attorney, Agent, or Firm* — Wenderoth, Lind & Ponack, LLP

(57) ABSTRACT

In an exhaust gas treatment method for an internal combustion engine, a DPF abnormal combustion causing operation is determined to have occurred when the internal combustion engine shifts from a high rotation or high load operation region α to a low rotation, low load operation region β within a set time $T_1$. When it is determined that a DPF abnormal combustion causing operation has occurred, abnormal combustion of PM collected in the DPF is suppressed by fully opening an intake throttle valve (44) in order to increase an exhaust gas flow so that heat is removed by sensible heat of the exhaust gas, thereby cooling a DPF device (52), and continuing a late post-injection in order to reduce an oxygen concentration of the DPF.

20 Claims, 7 Drawing Sheets

(56) References Cited

U.S. PATENT DOCUMENTS

| | | |
|---|---|---|
| 2003/0217549 A1 | 11/2003 | Watanabe et al. |
| 2003/0230060 A1 | 12/2003 | Yahata et al. |
| 2005/0060992 A1* | 3/2005 | Kogo et al. .................. 60/311 |
| 2007/0193258 A1* | 8/2007 | Berke .......................... 60/297 |

FOREIGN PATENT DOCUMENTS

| | | |
|---|---|---|
| JP | 2003-254133 | 9/2003 |
| JP | 2004-68804 | 3/2004 |
| JP | 2004-190668 | 7/2004 |
| JP | 2005-113800 | 4/2005 |
| JP | 2006-118461 | 5/2006 |
| JP | 2006-274907 | 10/2006 |
| JP | 2008-38821 | 2/2008 |
| JP | 4161575 | 10/2008 |

OTHER PUBLICATIONS

International Search Report issued Aug. 24, 2010 in corresponding International (PCT) Application No. PCT/JP2010/059936.
Office Action issued Jul. 10, 2013 in corresponding Korean Application No. 10-2012-7013968 (with English translation).
Office Action issued Feb. 24, 2014 in corresponding Japanese patent application No. 2010-016704 with English translation.
Decision to Grant a Patent issued Aug. 5, 2014 in corresponding Japanese patent application No. 2010-016704 (with English translation).

* cited by examiner

US 8,857,158 B2

AFTERTREATMENT SYSTEM AND CONTROL STRATEGY FOR INTERNAL COMBUSTION ENGINE

BACKGROUND OF THE INVENTION

1. Technical Field

The present invention relates to an aftertreatment system and control strategy in which a diesel oxidation catalyst and a filter that collects particulate matter are provided in an exhaust pipe of an internal combustion engine, and more particularly a diesel engine.

2. Description of the Related Art

According to exhaust gas regulations for diesel engines, reducing particulate matter ("PM" hereafter) is equally as important as reducing $NO_x$. A PM collecting unit using a filter known as a DPF (Diesel Particulate Filter) is known to be effective in removing PM from exhaust gas.

In an operating condition where an exhaust gas temperature is low, PM gathers in the DPF continuously, and therefore active regeneration for removing the PM through combustion must be performed on the DPF by forcibly increasing the temperature of the exhaust gas.

This active regeneration process will now be described using FIGS. 7 and 8. A diesel oxidation catalyst (DOC) is provided in an exhaust pipe on an upstream side of the DPF.

As shown in FIG. 7, fuel is injected into a combustion cylinder in a main injection, whereupon the fuel injected in the main injection is burned to generate an engine output. Following the main injection, fuel is injected in an early post-injection. As shown in FIG. 7, the early post-injection is performed at a start time $t_1$ of the active regeneration process. The fuel injected in the early post-injection is burned in a high-temperature atmosphere in the combustion cylinder, and the diesel oxidation catalyst is heated to an activation temperature by a high temperature generated through combustion of early post-injection (DOC heating stage A).

Next, before bottom dead center (a time $t_2$ in FIG. 8), more fuel is injected in a late post-injection. The fuel injected in the late post-injection is oxidized by the activated diesel oxidation catalyst, and the temperature of the exhaust gas is raised to or above 600° C. by heat of reaction generated at this time (DPF inlet temperature increasing stage B). By increasing the temperature of the exhaust gas to or above 600° C., the PM collected in the DPF is burned and thus removed from the DPF.

As shown in FIG. 9, however, when the diesel engine shifts from a normal operation to a low rotation, low load operation such as an idling operation during the active regeneration process of the DPF, the PM collected in the DPF may burn abnormally such that the DPF is abnormally heated. In FIG. 9, a curve X is a temperature at an inlet of a DPF device, a curve Y is an internal temperature of the DPF device, and a curve Z is a pressure of the exhaust gas flowing through the aftertreatment system and exhaust pipe.

When the diesel engine shifts from a normal operation to a low rotation, low load operation such as an idling operation during the active regeneration process of the DPF, an oxygen concentration of the exhaust gas increases and an amount of heat removed from the DPF by the exhaust gas decreases. Accordingly, the internal temperature of the DPF increases, leading to an increase in a combustion speed of the PM collected in the DPF. Therefore, as shown in FIG. 9, the internal temperature of the DPF device may increase abnormally, and as a result, the DPF may break due to heat-generated melting or cracks. Further, in a case where a catalyst is coated on the DPF, thermal deterioration may occur in the catalyst.

Patent Document 1 discloses an aftertreatment system in which a DPF device is provided in an exhaust pipe of a diesel engine. In this aftertreatment system, the temperature of the DPF is detected, and when it is determined that PM collected in the DPF may burn rapidly, control is performed during throwing out of a clutch that engages and disengages the internal combustion engine and a load thereof to switch rotation of the internal combustion engine to a post-clutch disengagement rotation speed gradually at a gentler rate than normal. It is disclosed that in so doing, an abnormal temperature increase in the DPF can be prevented while ensuring that a sufficient amount of exhaust gas flows into the DPF.

Patent Document 2 discloses an aftertreatment system in which a diesel oxidation catalyst and a DPF device are provided in an exhaust pipe of a diesel engine, including an EGR pipe for returning a part of the exhaust gas to an intake pipe, and a control prohibition unit that closes an EGR valve and prohibits reduction of an exhaust gas flow when an accumulated amount of PM collected in the DPF is detected to be equal to or greater than a predetermined amount and a temperature of the DPF is detected to be equal to or higher than a predetermined temperature while an internal combustion engine is in a no load or idling operation condition. In so doing, the exhaust gas flow is maintained and the DPF is cooled by removal of heat.

Patent Document 2 also proposes that, in conjunction with the aforesaid control, a post-injection be performed such that additional fuel injected in the post-injection reacts with oxygen in the exhaust gas, thereby reducing an amount of oxygen in the exhaust gas. Patent Document 2 discloses that in so doing, combustion of the PM is suppressed, thereby preventing an abnormal temperature increase in the DPF.

Patent Document 1: Japanese Patent Application Publication No. 2004-68804

Patent Document 2: Japanese Patent Application Publication No. 2003-27921

SUMMARY OF THE INVENTION

Technical Problem

A unit for preventing an abnormal temperature increase in a DPF according to Patent Document 1 operates only during clutch disengagement and performs control to reduce the engine rotation speed slowly. This unit cannot therefore be applied to rapid variation to a low load at times other than during clutch disengagement.

A unit for preventing an abnormal temperature increase in a DPF according to Patent Document 2 halts reduction of the exhaust gas flow and modifies the internal combustion engine to a high rotation side when three conditions are satisfied, i.e. when (1) the internal combustion engine is in a no load condition or an idling condition, (2) the accumulated amount of PM collected in the DPF equals or exceeds the predetermined amount, and (3) the temperature of the DPF (the exhaust gas temperature at an outlet of the DPF) equals or exceeds the predetermined temperature.

According to findings obtained by the present inventor and so on, however, abnormal combustion does not occur in a DPF provided in an internal combustion engine, and more particularly a diesel engine, merely in a low rotation, low load condition. More specifically, it has been found that abnormal combustion only occurs when the engine shifts from a high rotation condition or a high load condition to a low rotation, low load condition within a certain fixed time, or in other words when a rotation speed or a load of the engine varies with a certain degree of rapidity.

Hence, with the unit disclosed in Patent Document 2, control is performed unnecessarily in cases where abnormal combustion has not occurred in the DPF, leading to a corresponding reduction in a combustion efficiency of the diesel engine.

Further, in Patent Document 2, a unit for closing the EGR valve must be provided so that an operation for closing the EGR valve can be performed in conjunction with the control, and therefore no effect is obtained in relation to an internal combustion engine that does not use an EGR valve.

The present invention has been designed in consideration of these problems in the prior art, and an object thereof is to provide an exhaust gas treatment device in which a diesel oxidation catalyst and a DPF are provided in an exhaust pipe of an internal combustion engine in order to remove PM from exhaust gas, wherein breakage of the DPF due to heat-generated melting or cracks, and in a case where a catalyst is coated on the DPF, thermal deterioration of the catalyst, are prevented by preventing abnormal combustion from occurring in the DPF when the internal combustion engine varies from a high rotation condition or a high load condition to a low rotation, low load condition. Another object of the present invention is to realize an inexpensive control device for preventing abnormal combustion in the DPF.

Solution to Problem

To achieve these objects, an exhaust gas treatment method for an internal combustion engine according to the present invention is an exhaust gas treatment method for an internal combustion engine, including a collecting step of collecting particulate matter contained in an exhaust gas discharged from the internal combustion engine in a filter, and a active regeneration step of post-injecting a fuel to heat the exhaust gas to a combustion temperature of the particulate matter in a diesel oxidation catalyst, whereby the particulate matter collected in the filter is burned and removed by the heated exhaust gas, the exhaust gas treatment method including:

a first step of detecting an exhaust gas temperature at an inlet of the filter and determining whether or not a DPF abnormal combustion causing operation, in which the internal combustion engine shifts from a high rotation or high load operating condition to a low rotation, low load operating condition including an idling condition within a set time, has occurred during the active regeneration step;

a second step of increasing an exhaust gas flow by performing at least one operation from among fully opening a throttle valve provided in an intake pipe or an exhaust pipe and not reducing a rotation speed during a low load operation to or below a set value when, in the first step, the exhaust gas temperature at the inlet of the filter is determined to equal or exceed the combustion temperature of the particulate matter and the DPF abnormal combustion causing operation is determined to have occurred; and a third step that is performed in parallel with the second step to reduce a combustion speed of the particulate matter by reducing an oxygen concentration of the filter while continuing the post-injection as is.

In the method according to the present invention, the exhaust gas temperature at the inlet of the DPF is detected in the first step, and it can therefore be confirmed that the active regeneration step is being performed reliably on the DPF.

Further, as described above, according to the findings obtained by the present inventor and so on, abnormal combustion does not occur in a DPF provided in an internal combustion engine, and more particularly a diesel engine, merely in a low rotation, low load condition, and abnormal combustion only occurs when the engine shifts from a high rotation condition or a high load condition to a low rotation, low load condition within a fixed time.

On the basis of these findings, a determination is made in the method according to the present invention as to whether or not a DPF abnormal combustion causing operation, in which the internal combustion engine shifts from a high rotation or high load operating condition to a low rotation, low load operating condition including an idling condition within a set time, has occurred. The second step and the third step are performed only after determining that a DPF abnormal combustion causing operation has occurred, and therefore the occurrence of abnormal combustion in the DPF can be predicted with a considerable degree of accuracy. Hence, in contrast to Patent Document 2, unnecessary control is not performed, and as a result, the combustion efficiency of the internal combustion engine does not decrease.

A DPF abnormal combustion causing operation is preferably determined to have occurred when the time required for the internal combustion engine to shift from a high rotation or high load condition to a low rotation, low load condition is within a range of ten seconds in particular. The reason for this is that in a steady state, a combustion speed at low rotation/low load is lower than a combustion speed in a high rotation or high load condition, and therefore, when a high rotation or high load condition varies transiently to low rotation/low load, a low rotation, low load operating condition is established while the combustion speed of the PM in the DPF remains high, leading to an increase in the probability of a DPF abnormal combustion causing operation. As a result, a DPF abnormal combustion causing operation can be determined more reliably.

Further, in the method according to the present invention, when a DPF abnormal combustion causing operation is determined to have occurred, at least one operation from among fully opening the throttle valve provided in the intake pipe or the exhaust pipe and not reducing the rotation speed during a low load operation to or below a set value is performed in the second step.

In so doing, a reduction in the exhaust gas flow in a low rotation condition or a low load condition can be suppressed, and therefore heat can be removed by sensible heat of the exhaust gas, thereby suppressing an abnormal temperature increase in the DPF. Further, the throttle valve can be fully opened rather than controlling an opening of the throttle valve, and therefore only simple control is required, enabling a reduction in the cost of the control device.

Furthermore, the third step, in which the post-injection is continued as is, is performed in parallel with the second step, and therefore the oxygen concentration of the DPF can be reduced, enabling a reduction in the combustion speed of the particulate matter. By performing the third step in parallel with the second step in this manner, an abnormal temperature increase in the DPF can be eliminated early.

Moreover, the post-injection is continued as is in the third step, and therefore the active regeneration step can be continued even in a low rotation, low load condition. Hence, the active regeneration step is not interrupted and restarted repeatedly, and therefore the DPF can be maintained at a constant temperature enabling combustion and removal of the PM. As a result, a thermal efficiency of the internal combustion engine does not decrease.

Further, since the post-injection is continued as is, an amount of post-injected fuel required to increase the temperature of the DPF when active regeneration is resumed after being interrupted can be reduced. As a result, reductions can be achieved in oil dilution, which tends to occur during the active regeneration step, and an amount of consumed fuel.

In the method according to the present invention, an estimated accumulation amount of the particulate matter is preferably determined, each of the first step to the third step is preferably performed when the estimated accumulation amount exceeds a threshold, and an opening control of the throttle valve is resumed and the post-injection is continued when the estimated accumulation amount is equal to or below the threshold. Abnormal combustion becomes steadily more likely to occur in the DPF as the estimated accumulation amount of the particulate matter increases, and therefore, by determining the estimation accumulation amount, abnormal combustion in the DPF can be estimated with a higher probability.

Hence, by performing each of the first step to the third step when the estimated accumulation amount exceeds the set threshold, abnormal combustion in the DPF can be suppressed reliably. Moreover, unnecessary control need not be performed when abnormal combustion does not occur in the DPF.

Further, by restarting opening control of the throttle valve and continuing the post-injection when the estimated accumulation amount is equal to or smaller than the threshold, the exhaust gas amount can be reduced while suppressing abnormal combustion in the DPF. As a result, the amount of post-injected fuel can be reduced, enabling a corresponding reduction in oil dilution.

As regards a method of estimating the amount of accumulated particulate matter, a PM discharge amount may be determined from a fuel injection amount of the internal combustion engine, and the accumulation amount may be determined by subtracting a PM combustion amount from the PM discharge amount, for example. Alternatively, the accumulation amount may be determined from a differential pressure of the exhaust gas to the front and rear of the DPF.

In the method according to the present invention, a temperature of the exhaust gas passing through the diesel oxidation catalyst is preferably detected after performing each of the first step to the third step, and when the temperature of the exhaust gas is equal to or below an activation temperature of the diesel oxidation catalyst, the active regeneration step is preferably interrupted.

By implementing the second step and the third step, the exhaust gas temperature decreases so that when the temperature of the exhaust gas passing through the diesel oxidation catalyst is equal to or below the activation temperature of the diesel oxidation catalyst, active regeneration is not performed. It is pointless to continue the active regeneration step at this time, and therefore the active regeneration step is interrupted. As a result, a reduction in the amount of consumed fuel can be achieved.

An exhaust gas treatment device for an internal combustion engine according to the present invention, which can be used directly during implementation of the method according to the present invention, is an exhaust gas treatment device for an internal combustion engine, in which a diesel oxidation catalyst and a filter are provided in an exhaust pipe of the internal combustion engine, particulate matter contained in an exhaust gas is collected in the filter, and a fuel is post-injected to heat the exhaust gas to a combustion temperature of the particulate matter in the diesel oxidation catalyst, whereby the particulate matter collected in the filter is burned and removed by the heated exhaust gas, the exhaust gas treatment device including:
a throttle valve provided in an intake pipe or the exhaust pipe;
a temperature sensor that detects an exhaust gas temperature at an inlet of the filter;
a DPF abnormal combustion determination unit that determines whether or not a DPF abnormal combustion causing operation, in which the internal combustion engine shifts from a high rotation or high load operating condition to a low rotation, low load operating condition including an idling condition within a set time, has occurred; and
a controller that performs control to increase an exhaust gas flow while continuing the post-injection as is by performing at least one operation from among fully opening the throttle valve and not reducing a rotation speed during a low load operation to or below a set value when, in a active regeneration step of burning and removing the particulate matter collected in the filter, the exhaust gas temperature at the inlet of the filter is determined to equal or exceed the combustion temperature of the particulate matter and the DPF abnormal combustion determination unit determines that the DPF abnormal combustion causing operation has occurred.

In the device according to the present invention, the DPF abnormal combustion determination unit determines whether or not abnormal combustion has occurred in the DPF, and therefore the occurrence of DPF abnormal combustion can be predicted more reliably. As a result, unnecessary control is not performed, and therefore the combustion efficiency of the internal combustion engine does not decrease.

Further, when it is determined that a DPF abnormal combustion causing operation has occurred, the controller performs at least one operation from among fully opening the throttle valve and not reducing the rotation speed during the low load operation to or below the set value, and as a result, the exhaust gas flow is increased such that heat is removed by the sensible heat of the exhaust gas, thereby cooling the DPF. At the same time, the post-injection is continued as is in order to reduce the oxygen concentration of the DPF, thereby reducing the combustion speed of the PM collected in the DPF. As a result, an abnormal temperature increase in the DPF can be eliminated early.

The device according to the present invention preferably further includes a unit that estimates an accumulation amount of the particulate matter, wherein the controller preferably performs control to increase the exhaust gas flow while continuing the post-injection as is by performing at least one operation from among fully opening the throttle valve and not reducing the rotation speed during the low load operation to or below the set value when the exhaust gas temperature at the inlet of the DPF is determined to equal or exceed the combustion temperature of the particulate matter, the DPF abnormal combustion determination unit determines that the DPF abnormal combustion causing operation has occurred, and the accumulation amount of the particulate matter estimated by this unit exceeds a threshold.

By performing this operation, abnormal combustion in the DPF can be estimated with a higher probability. Therefore, by performing each of the first step to the third step when the estimated accumulated PM amount exceeds the set threshold, abnormal combustion in the DPF can be suppressed reliably, and unnecessary control can be avoided in a case where abnormal combustion has not occurred in the DPF.

Advantageous Effects of Invention

The method according to the present invention is a control strategy of aftertreatment system for an internal combustion engine, including a collecting step of collecting particulate matter contained in an exhaust gas discharged from the internal combustion engine in a filter, and a active regeneration step of post-injecting a fuel to heat the exhaust gas to a combustion temperature of the particulate matter in a diesel oxidation catalyst, whereby the particulate matter collected in the filter is burned and removed by the heated exhaust gas, the control strategy including: a first step of detecting an exhaust gas temperature at an inlet of the filter and determining whether or not a DPF abnormal combustion causing operation, in which the internal combustion engine shifts from a high rotation or high load operating condition to a low rotation, low load operating condition including an idling condition within a set time, has occurred during the active regeneration step; a second step of increasing an exhaust gas flow by performing at least one operation from among fully opening a throttle valve provided in an intake pipe or an exhaust pipe and not reducing a rotation speed during a low load operation to or below a set value when, in the first step, the exhaust gas temperature at the inlet of the filter is determined to equal or exceed the combustion temperature of the particulate matter and the DPF abnormal combustion causing operation is determined to have occurred; and a third step that is performed in parallel with the second step to reduce a combustion speed of the particulate matter by reducing an oxygen concentration of the filter while continuing the post-injection as is. Hence, an abnormal temperature increase caused by abnormal combustion in the DPF can be eliminated early, and as a result, breakage of the DPF due to heat-generated melting and cracks can be prevented and thermal deterioration of the catalyst coated on the DPF can be prevented.

Further, the occurrence of abnormal combustion in the DPF can be predicted with a considerable degree of accuracy, and therefore unnecessary control is not performed when abnormal combustion has not occurred in the DPF. As a result, the thermal efficiency of the internal combustion engine does not decrease. Moreover, the post-injection is continued as is in the third step, and therefore the active regeneration step is not interrupted and restarted repeatedly. As a result, the DPF can be maintained at a constant temperature enabling combustion and removal of the PM, and therefore the thermal efficiency of the internal combustion engine does not decrease. Furthermore, since the post-injection is continued as is, reductions can be achieved in the oil dilution that tends to occur during the active regeneration step and the amount of consumed fuel.

The device according to the present invention is an aftertreatment system for an internal combustion engine, in which a diesel oxidation catalyst and a filter are provided in an exhaust pipe of the internal combustion engine, particulate matter contained in an exhaust gas is collected in the filter, and a fuel is post-injected to heat the exhaust gas to a combustion temperature of the particulate matter in the diesel oxidation catalyst, whereby the particulate matter collected in the filter is burned and removed by the heated exhaust gas, the aftertreatment system including: a throttle valve provided in an intake pipe or the exhaust pipe; a temperature sensor that detects an exhaust gas temperature at an inlet of the filter; a DPF abnormal combustion determination unit that determines whether or not a DPF abnormal combustion causing operation, in which the internal combustion engine shifts from a high rotation or high load operating condition to a low rotation, low load operating condition including an idling condition within a set time, has occurred; and a controller that performs control to increase an exhaust gas flow while continuing the post-injection as is by performing at least one operation from among fully opening the throttle valve and not reducing a rotation speed during a low load operation to or below a set value when, in a active regeneration step of burning and removing the particulate matter collected in the filter, the exhaust gas temperature at the inlet of the filter is determined to equal or exceed the combustion temperature of the particulate matter and the DPF abnormal combustion determination unit determines that the DPF abnormal combustion causing operation has occurred. Hence, similar actions and effects to the method according to the present invention can be obtained.

DETAILED DESCRIPTION OF THE INVENTION

Figure 1:
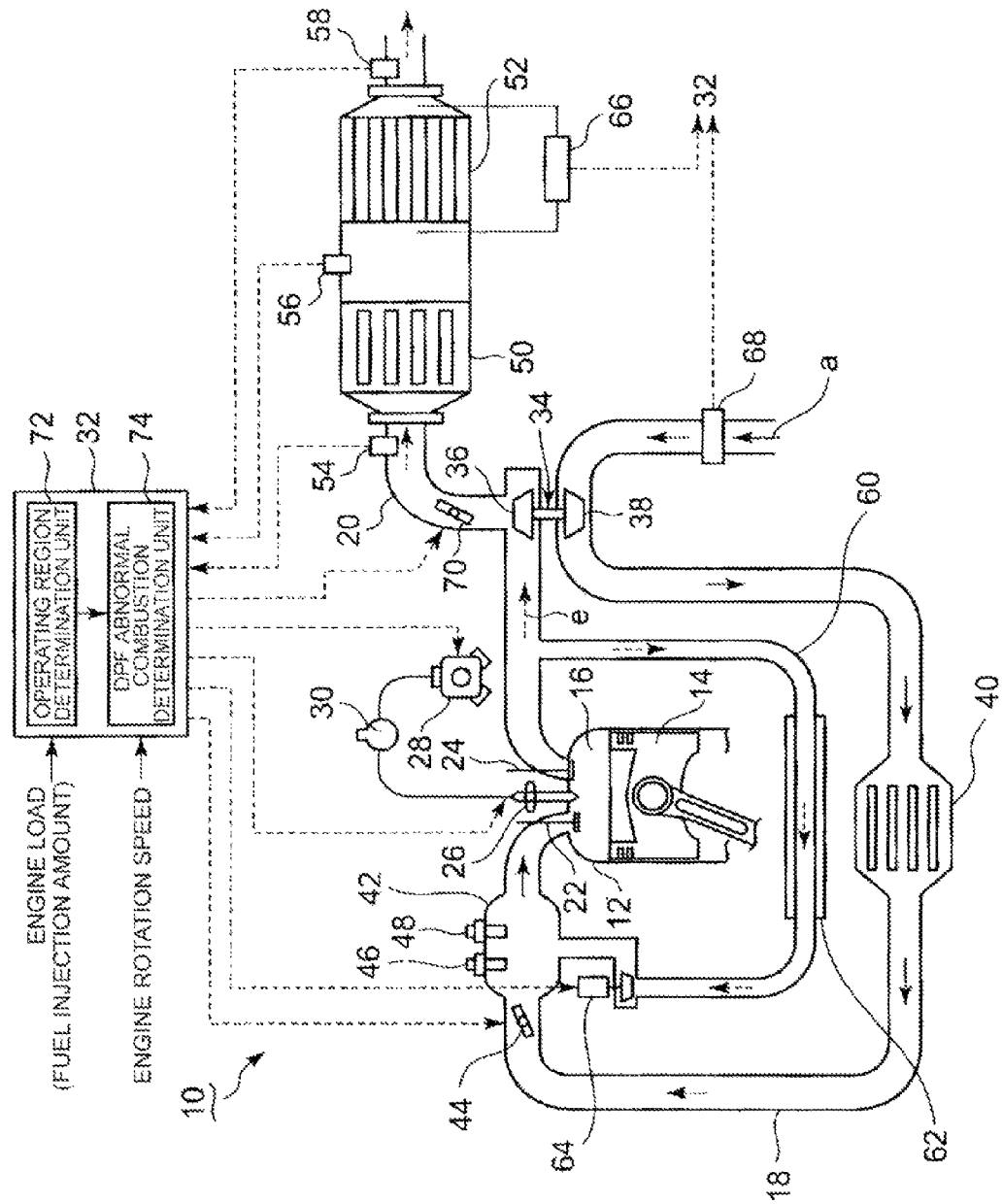
FIG. 1 is a system diagram of a diesel engine according to a first embodiment of a method and a device according to the present invention.

The present invention will be described in detail below using embodiments illustrated in the drawings. Note, however, that unless specific description is provided to the contrary, dimensions, materials, shapes, relative arrangements, and so on of constitutional components described in the embodiments are not intended to limit the scope of the present invention.

First Embodiment

Figure 2:
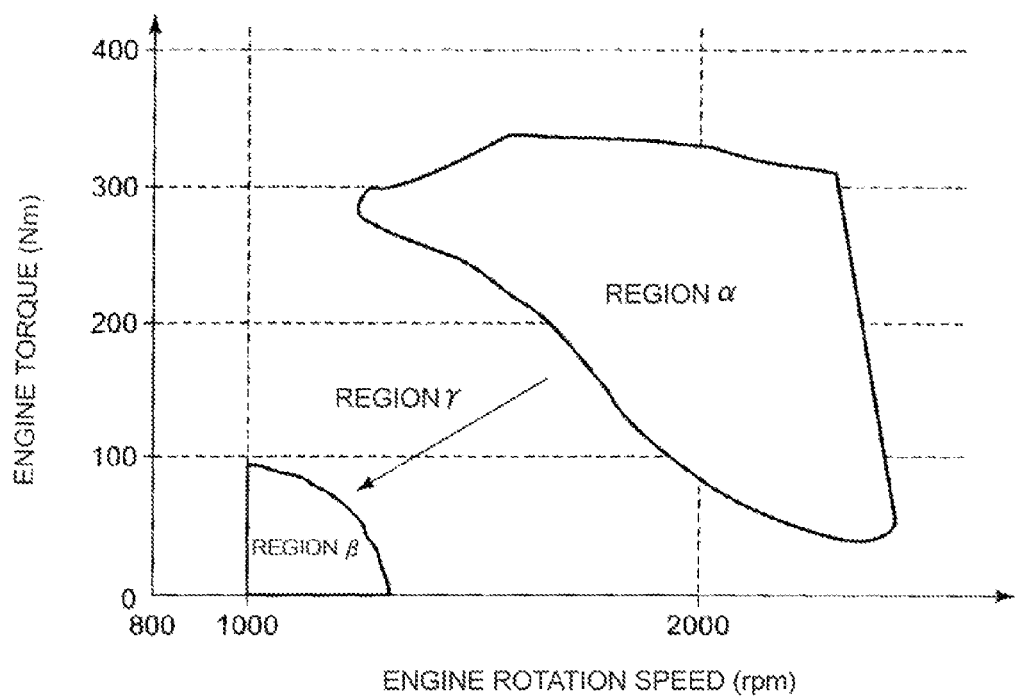
FIG. 2 is a diagram showing an example of a DPF abnormal combustion causing operation according to the first embodiment.
Figure 3:
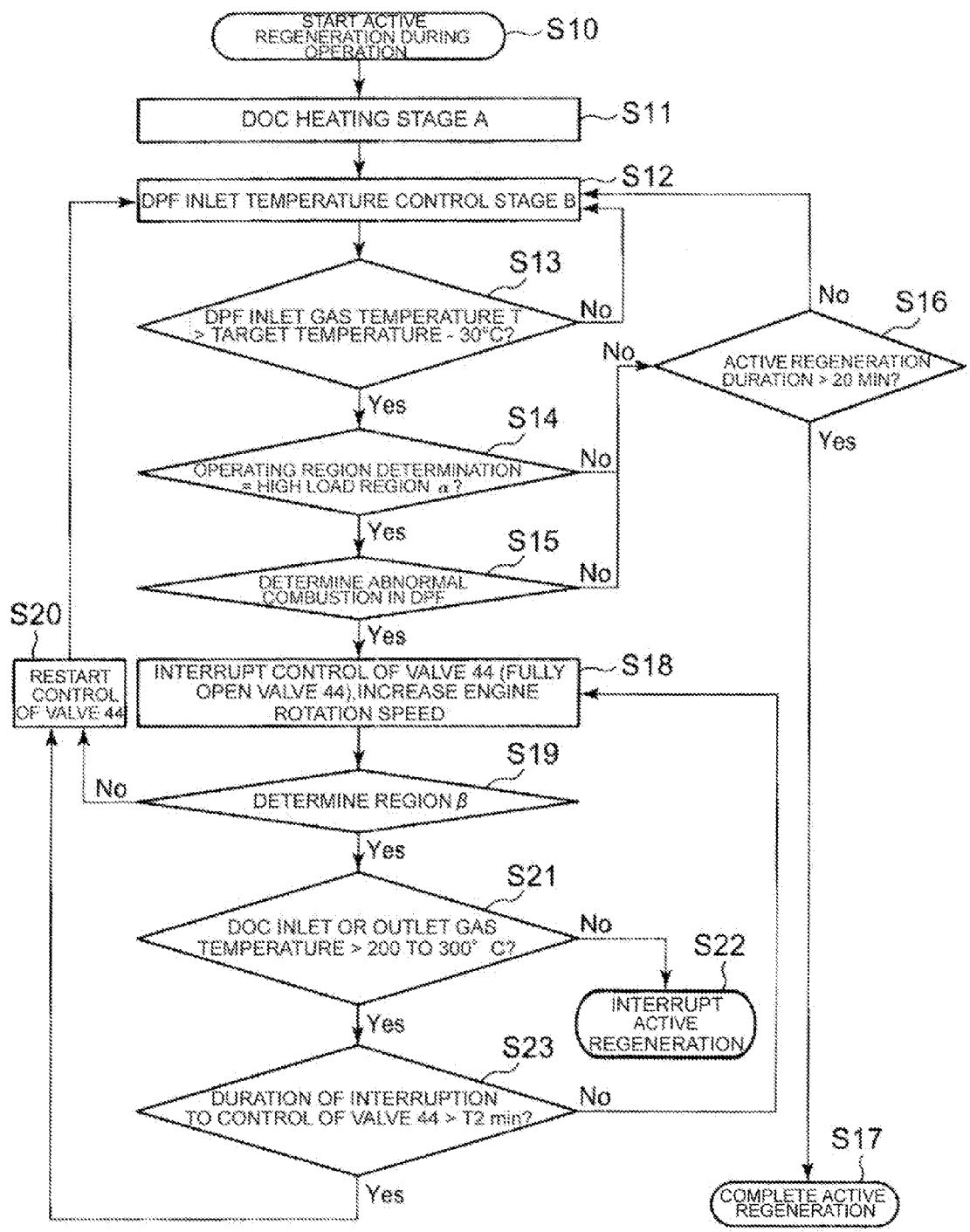
FIG. 3 is a flowchart showing operation procedures according to the first embodiment.

A first embodiment in which the method and device according to the present invention are applied to a diesel engine will now be described using FIGS. 1 to 3. In FIG. 1, a piston 14 is built into an interior of a combustion cylinder 12 of a diesel engine 10, and a combustion chamber 16 is formed above the piston 14. An intake pipe 18 and an exhaust pipe 20 are connected to a cylinder head of the combustion cylinder 12. An intake valve 22 and an exhaust valve 24 are provided in respective connecting portions between the intake pipe 18 and exhaust pipe 20 and the combustion cylinder 12.

An injector 26 that injects fuel into the combustion chamber 16 is provided in a central upper portion of the cylinder head. Fuel such as light oil is supplied to the injector 26 at high pressure from an injector pump 28 via a common rail (an accumulator) 30, and the injector 26 injects the fuel into the combustion chamber 16. An injection timing and an injection amount of the fuel are controlled precisely by an ECU 32. The injected fuel intermixes with air supplied from the intake pipe 18, and a resulting air-fuel mixture is compressed, ignited, and burned in the combustion chamber 16.

The diesel engine 10 includes an exhaust turbocharger 34 constituted by an exhaust turbine 36 disposed in the exhaust pipe 20 and a compressor 38 disposed in the intake pipe 18 coaxially with the exhaust turbine 36. Air a discharged from the compressor 38 of the exhaust turbocharger 34 passes through the intake pipe 18 and enters an intake air chamber 42 after being cooled by an intercooler 40. An intake throttle valve 44 that controls an opening of the intake pipe 18 is provided on an inlet side of the intake air chamber 42. Further, an intake air pressure sensor 46 and an intake air temperature sensor 48 are provided in the intake air chamber 42.

A diesel oxidation catalyst 50 is provided in the exhaust pipe 20 on a downstream side of the exhaust turbine 36, and a DPF device 52 is provided in the exhaust pipe 20 on a downstream side of the diesel oxidation catalyst 50. Combustion gas obtained as a result of combustion in the combustion chamber 16, or in other words exhaust gas e, is discharged to the exhaust pipe 20, and the exhaust gas e drives the exhaust turbine 36 of the exhaust turbocharger 34, thereby serving as a power supply of the compressor 38. The exhaust gas e then passes through the diesel oxidation catalyst 50 and the DPF device 52 such that PM contained in the exhaust gas e is collected by the DPF device 52. After the DPF device 52 removes the PM, the exhaust gas e is discharged to the outside through a muffler outlet, not shown in the drawing.

Exhaust gas temperature sensors 54, 56, and 58 that detect a temperature of the exhaust gas e are provided respectively in the exhaust pipe 20 on an inlet side of the diesel oxidation catalyst 50 and on an inlet side and an outlet side of the DPF device 52. Further, a differential pressure sensor 66 is provided to detect a differential pressure of the exhaust gas e between the inlet and the outlet of the DPF device 52, and an intake air flow meter 68 is provided in an inlet portion of the intake pipe 18. Furthermore, an exhaust throttle valve 70 that controls an exhaust gas flow is provided in the exhaust pipe 20.

An EGR pipe 60 is connected between the intake pipe 18 and the exhaust pipe 20. An EGR cooler 62 and an EGR valve 64 that controls an opening of the EGR pipe 60 are provided in the EGR pipe 60. A part of the exhaust gas e passes through the EGR pipe 60 and is returned to the air supply chamber 42 after being cooled by the EGR cooler 62. Thus, an amount of oxygen in the intake air is reduced, leading to a reduction in a peak combustion temperature, and as a result, $NO_x$ generation is suppressed.

Detection values from the exhaust gas temperature sensors 54, 56, 58, the differential pressure sensor 66, and the intake air flow meter 68, and an opening signal from the exhaust throttle valve 70 are transmitted to an ECU 32. Further, an engine load signal or a fuel injection amount signal and an engine rotation speed are input into the ECU 32. The ECU 32 controls an operation of the diesel engine 10 by controlling the injector 26, the injector pump 28, the intake throttle valve 44, the EGR valve 64, and the like on the basis of these input values.

The ECU 32 includes an operating region determination unit 72 and a DPF abnormal combustion determination unit 74. The operating region determination unit 72 determines a region, from among regions shown in FIG. 2, to which an operating condition of the diesel engine 10 belongs from the engine load signal or fuel injection amount signal and the engine rotation speed input into the ECU 32. As shown in FIG. 2, the DPF abnormal combustion determination unit 74 determines that a DPF abnormal combustion causing operation that may lead to abnormal combustion in the DPF device 52 has occurred when the diesel engine 10 shifts from a region α indicating a high rotation or high load operating condition to a region β indicating a low rotation, low load operating condition including an idling condition via a region γ indicating a medium rotation or medium load operating condition within a set time $T_1$ (a range of 10 seconds, for example).

Figure 7:
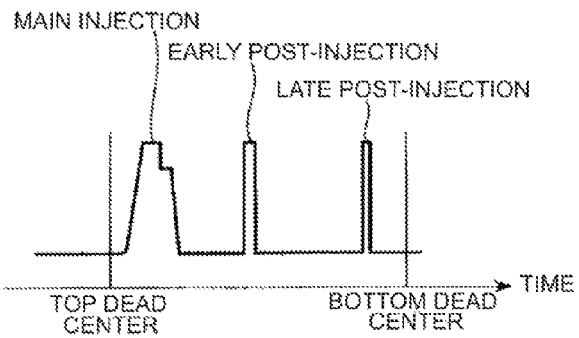
FIG. 7 is a diagram showing a fuel injection process of a diesel engine.

Next, using FIG. 3, operational procedures for operating the diesel engine 10 and performing a active regeneration process while the diesel 10 is operative will be described. In FIG. 3, when the ECU 32 issues a command to start the active regeneration process (Step 10), fuel is injected into the combustion chamber 16 in a main injection and then injected in an early post-injection at a start time $t_1$ of the active regeneration process, as shown in FIG. 7. The fuel injected in the early post-injection is burned at the temperature of the combustion chamber 16, and as shown in FIG. 8, the diesel oxidation catalyst 50 is heated to an activation temperature at a diesel oxidation catalyst heating stage A (Step 11).

When the diesel oxidation catalyst 50 does not reach or exceed the activation temperature even after the early post-injection, the diesel oxidation catalyst 50 is heated by throttling the intake pipe 18 using the intake throttle valve 44 and varying conditions of the early post-injection. The throttling by the intake throttle valve 44 and the variation in the conditions of the early post-injection are maintained even after the diesel oxidation catalyst 50 reaches or exceeds the activation temperature.

Figure 8:
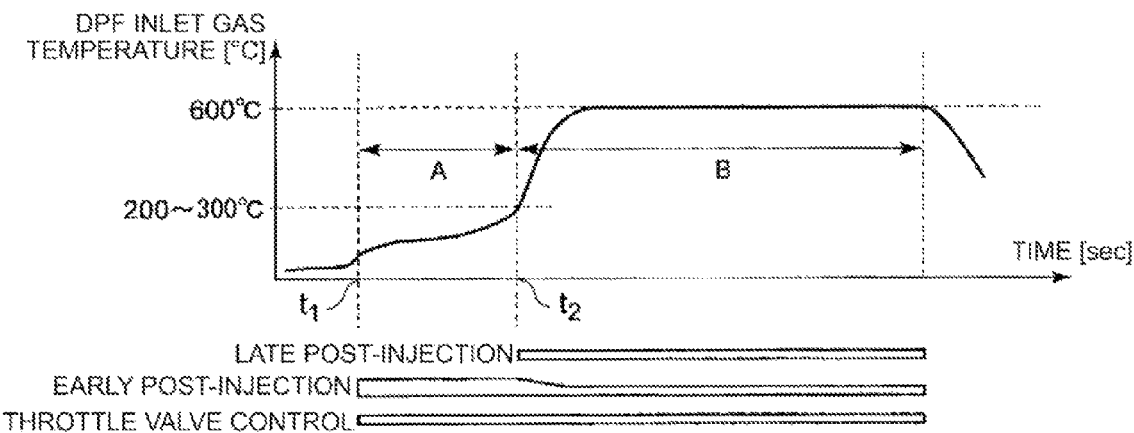
FIG. 8 is a diagram showing a active regeneration process performed on a DPF of the diesel engine.
Figure 9:
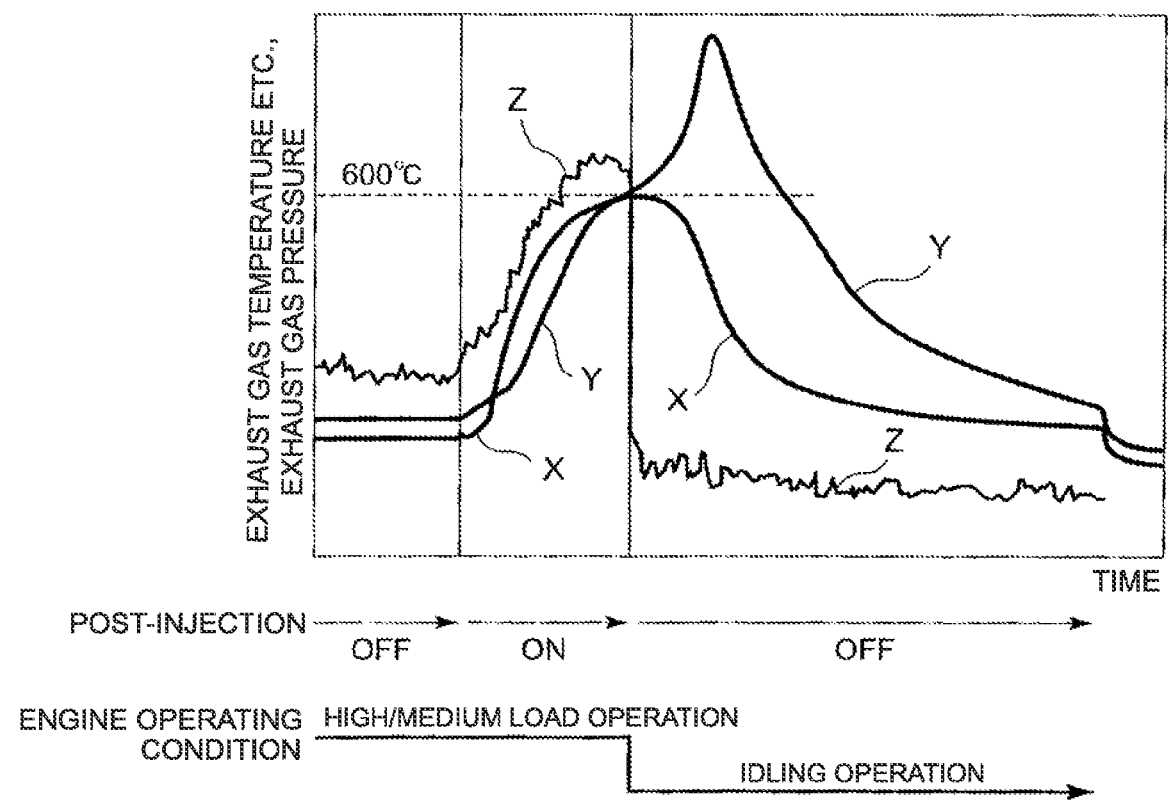
FIG. 9 is a diagram showing a DPF temperature in an aftertreatment system of a conventional diesel engine when the engine shifts to a low rotation condition or a low load condition.

Next, fuel is injected in a late post-injection before bottom dead center (at a time $t_2$ in FIG. 8). An unburned HC component of the fuel injected in the late post-injection is oxidized by the diesel oxidation catalyst 50 such that the temperature of the exhaust gas e is raised to or above 600° C. by heat of reaction generated at this time (DPF inlet temperature increasing stage B). By increasing the temperature of the exhaust gas e to or above 600° C., the PM collected in the DPF device 52 is burned and thus removed from the DPF device 52 (Step 12).

Next, the exhaust gas temperature at the inlet of the DPF device 52 is detected by the exhaust gas temperature sensor 56 (Step 13). It is confirmed here that the active regeneration process is reliably underway when the exhaust gas temperature at the inlet is higher than [target temperature (600° C., for example) −30° C.]. When the exhaust gas temperature at the inlet is equal to or below [target temperature (600° C., for example) −30° C.], the process returns to Step 12.

Next, the ECU 32 determines the operating condition from the engine load signal or fuel injection amount signal and the engine rotation speed (Step 14). When the determined operating condition belongs to the region α and subsequently shifts to the low rotation, low load operating region β, the DPF abnormal combustion determination unit 74 determines that a DPF abnormal combustion causing operation has occurred (Step 15).

When the operating condition does not belong to the region α (Step 14) or it is determined that a DPF abnormal combustion causing operation has not occurred (Step 15), the process returns to Step 12. Alternatively, when a duration of the active regeneration process (a period in which the exhaust gas temperature at the inlet of the DPF device 52 remains at 600±30° C.) exceeds a set allowable time (Step 16), the active regeneration process is terminated (Step 17).

When it is determined in Step 15 that the DPF abnormal combustion causing operation has occurred, control of the intake throttle valve 44 is interrupted and the intake throttle valve 44 is fully opened. Further, in this embodiment, a rotation speed γ that is higher than an engine rotation speed in a normal idling condition is set in advance, and in parallel with the interruption of control of the intake throttle valve 44, the engine rotation speed is raised to the rotation speed γ (Step 18).

For example, the engine rotation speed is increased from 1,000 rpm to 1,200 rpm. By performing this operation, the exhaust gas flow can be increased rapidly. At this time, the late post-injection is continued as is.

Next, the operating condition is determined again (Step 19), and when the operating condition does not belong to the region β, control of the intake throttle valve 44 is restarted (Step 20), whereupon the process returns to Step 12. When the operating condition remains in the region β, the exhaust gas temperature at the inlet or the outlet of the diesel oxidation catalyst 50 is detected by the exhaust gas temperature sensor 54 or 56 (Step 21). When the detected value is equal to or lower than the activation temperature, it is determined that the active regeneration process is not underway, and therefore the active regeneration process is interrupted (Step 22).

When a duration of the interruption to control of the intake throttle valve 44 exceeds a set allowable time $T_2$ (minutes), control of the intake throttle valve 44 is restarted (Step 20), whereupon the process returns to Step 12. When the duration does not exceed the set allowable time $T_2$, the process returns to Step 18.

According to this embodiment, when the DPF abnormal combustion determination unit 74 determines that a DPF abnormal combustion causing operation has occurred such that the danger of abnormal combustion in the DPF device 52 exists, the exhaust gas flow is increased so that heat is removed by sensible heat of the exhaust gas, and the late post-injection is continued in order to reduce an oxygen concentration of the DPF device 52 and a combustion speed of the PM. As a result, an abnormal temperature increase in the DPF device 52 can be eliminated early. Accordingly, breakage of the DPF due to heat-generated melting and cracks can be prevented, and thermal deterioration of the catalyst carried on the DPF can be forestalled.

In particular, the rotation speed γ that is higher than the engine rotation speed in a normal idling condition is set in advance, and in Step 18, the engine rotation speed is raised to the rotation speed γ in parallel with the interruption to control of the intake throttle valve 44 (i.e. full opening of the intake throttle valve 44). In so doing, the exhaust gas flow can be increased rapidly, and as a result, an abnormal temperature increase in the DPF device 52 can be eliminated early at an initial stage of control.

Figure 4:
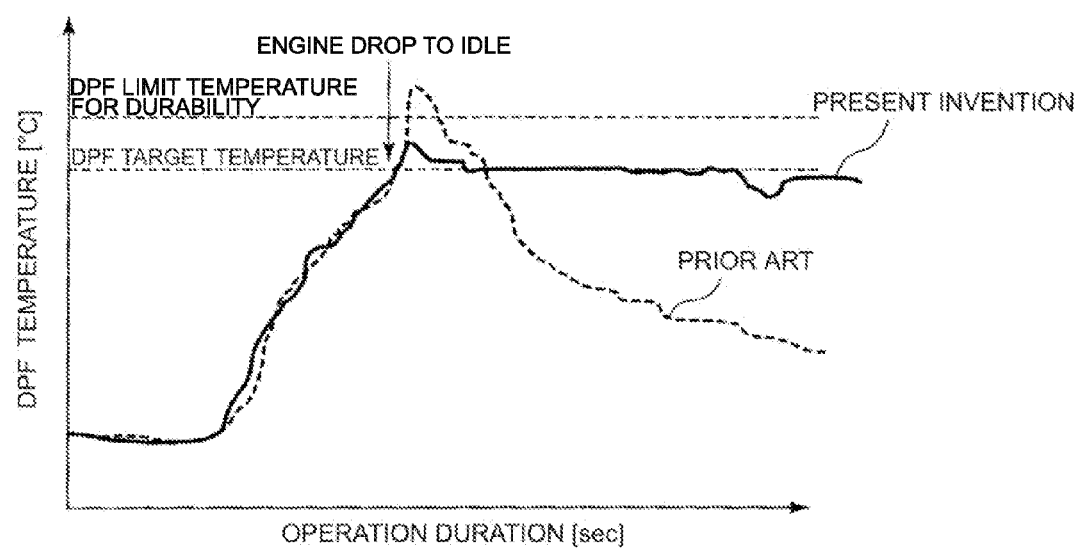
FIG. 4 is a diagram showing a transition of a DPF temperature according to the first embodiment.

FIG. 4 shows a comparison of a temperature transition of the DPF according to this embodiment and a temperature transition of the DPF in a conventional operation when the operating condition shifts from the region α to an idling operation (the region β) during the active regeneration process. As is evident from FIG. 4, according to this embodiment, the temperature of the DPF remains substantially at the target temperature (600° C., for example) without increasing significantly from the target temperature even when the diesel engine 10 shifts from the region α indicating a high rotation or high load operating condition to the region β indicating a low rotation, low load operating condition including an idling condition via the region γ indicating a medium rotation or medium load operating condition within the set time $T_1$.

Further, the danger of abnormal combustion in the DPF is determined to exist and abnormal combustion prevention control is performed only when the operating condition of the diesel engine 10 shifts from the high rotation or high load region α to a low rotation, low load operating condition including an idling condition within the set time $T_1$. Hence, in contrast to Patent Document 2, unnecessary control is not performed, and therefore the thermal efficiency of the diesel engine 10 does not decrease needlessly.

Furthermore, the late post-injection is continued as is even when a DPF abnormal combustion causing operation occurs, and therefore the active regeneration process can be continued without repeatedly interrupting and resuming the active regeneration process. As a result, the DPF can be maintained at a constant temperature enabling combustion of the PM, and therefore the thermal efficiency of the diesel engine 10 does not decrease.

Moreover, when active regeneration is restarted after being interrupted, an amount of post-injected fuel required to increase the temperature of the DPF can be reduced. As a result, reductions can be achieved in oil dilution, which tends to occur during the active regeneration process, and an amount of consumed fuel.

Furthermore, the control executed during abnormal combustion in the DPF is performed simply by interrupting control of the intake throttle valve 44 and fully opening the intake throttle valve 44, and therefore the cost of the control device can be reduced.

Note that it is permissible to perform only one of the operations performed in parallel in Step 18, i.e. interrupting control of the intake throttle valve 44 and raising the engine rotation speed to the rotation speed γ that is higher than the rotation speed of a normal idling operation.

Further, in the first embodiment, the exhaust gas flow is controlled by providing the intake throttle valve 44 in the intake pipe 18, but the exhaust gas flow may be controlled by controlling an opening of the exhaust throttle valve 70 provided in the exhaust pipe 20 rather than the intake pipe 18. Alternatively, the intake throttle valve 44 and the exhaust throttle valve 70 may both be controlled.

Furthermore, by increasing the exhaust gas flow during abnormal combustion in the DPF, the active regeneration process is interrupted when the temperature of the exhaust gas passing through the diesel oxidation catalyst is equal to or below the activation temperature of the diesel oxidation catalyst 50, and therefore a reduction in the amount of consumed fuel can be achieved.

Second Embodiment

Figure 5:
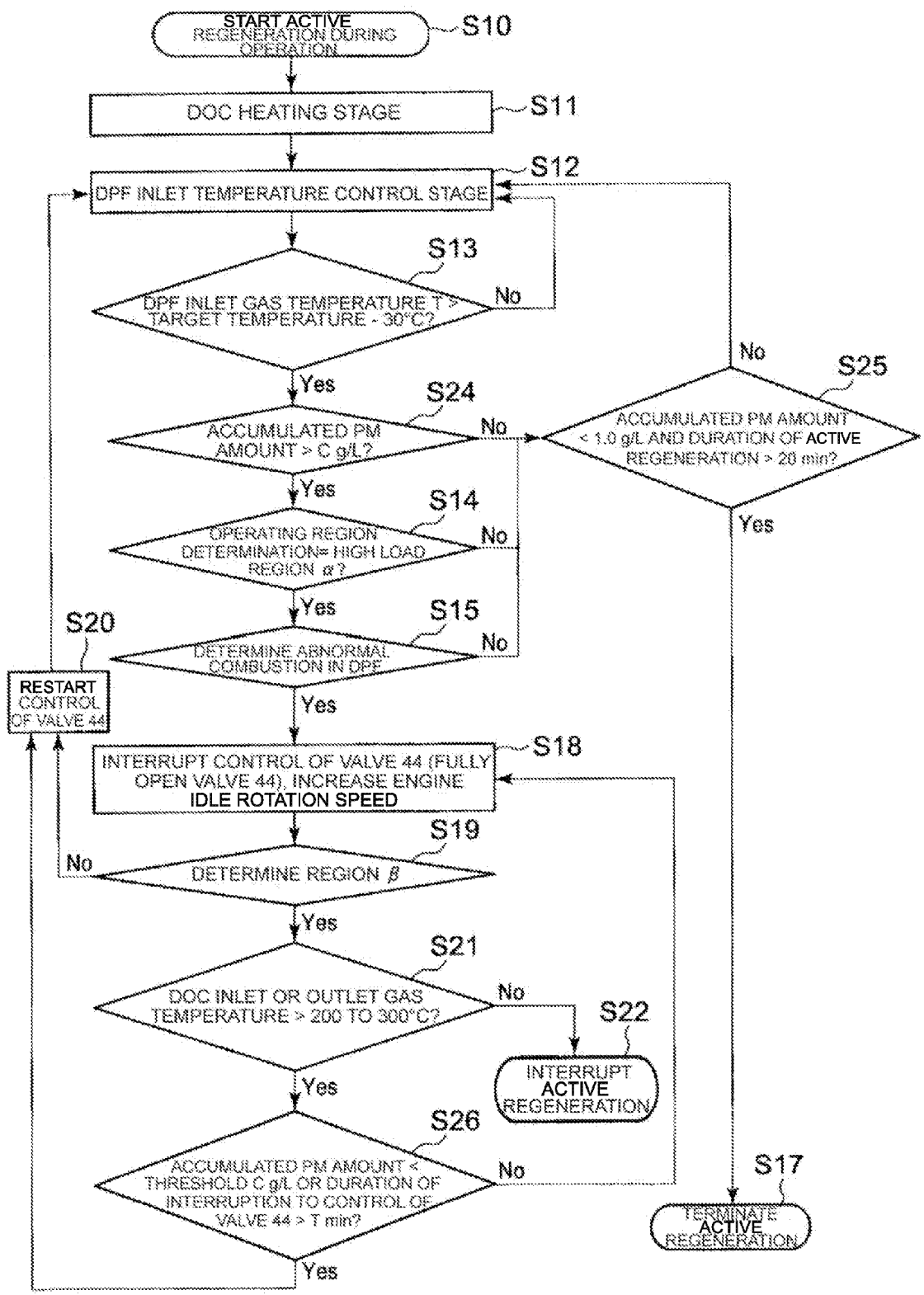
FIG. 5 is a flowchart showing operation procedures according to a second embodiment of a method and a device according to the present invention.

Next, a second embodiment of the method and device according to the present invention will be described using FIGS. 5 and 6. The configuration of the diesel engine 10 according to this embodiment is identical to the first embodiment. As shown in FIG. 5, in the control procedures according to this embodiment, Steps 24, 25, and 26 differ from the first embodiment, but all other steps are identical to the first embodiment.

In Step 25 of this embodiment, an accumulated amount of PM collected in the DPF device 52 is estimated. As regards an estimation method, the collected PM amount can be determined by determining the fuel injection amount and a fuel combustion amount input into the ECU 32 as functions of the exhaust gas temperature, and subtracting the fuel combustion amount from the fuel injection amount. Alternatively, the accumulated PM amount can be determined from the differential pressure of the exhaust gas to the front and rear of the DPF device 52, which is determined by the differential pressure sensor 66.

In this embodiment, a threshold C is provided in relation to the estimated accumulated PM amount such that the operation of the present invention is performed when the estimated accumulated PM amount exceeds the threshold C. Further, when the estimated accumulated PM amount is equal to or smaller than the threshold C and it is determined that a DPF abnormal combustion causing operation has not occurred, the process advances to Step 25. When, in Step 25, the estimated accumulated PM amount is equal to or smaller than a set value and the duration of the active regeneration process is equal to or greater than a set time, the active regeneration process is terminated. In other cases, the process returns to Step 12.

Furthermore, when the estimated accumulated PM amount is equal to or smaller than the threshold C or the duration of the interruption to control of the intake throttle valve 44 exceeds the set allowable time following Step 21, control of the intake throttle valve 44 is restarted, whereas in other cases, the process returns to Step 18. Note that at this time, the late post-injection is continued as is.

Figure 6:
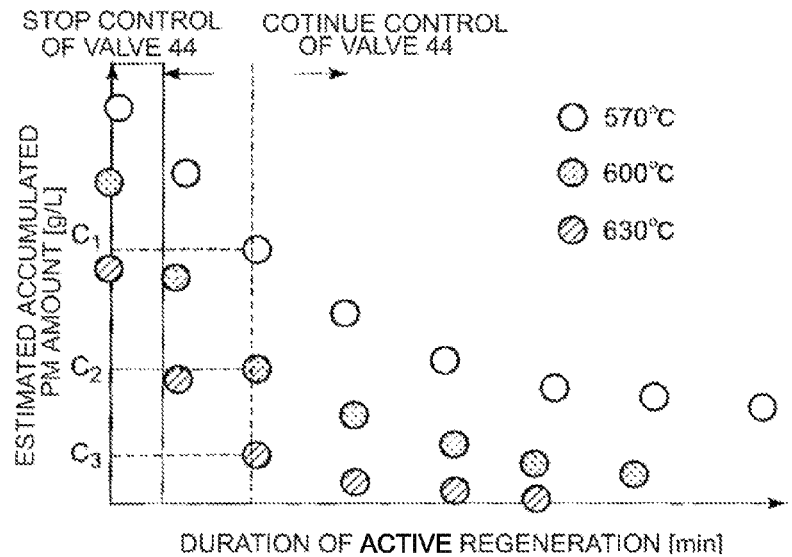
FIG. 6 is a diagram showing a threshold of a PM accumulation amount according to the second embodiment.

FIG. 6 shows thresholds $C_1$ to $C_3$ employed respectively when the target temperature of the DPF is 570° C., 600° C., and 630° C. As shown in FIG. 6, the threshold C is preferably varied in accordance with the target temperature of the DPF. More specifically, when the target temperature is low, the threshold C is increased, and when the target temperature is high, the threshold C is reduced. The reason for this is that abnormal combustion becomes steadily more likely to occur in the DPF as the target temperature increases, and therefore, when the threshold C is set low, the occurrence of abnormal combustion must be suppressed.

According to this embodiment, the estimated accumulated PM amount is used as an additional factor in determining whether or not a DPF abnormal combustion causing operation has occurred, and the operation is varied in accordance with the estimated accumulated PM amount. In so doing, conditions under which abnormal combustion occurs in the DPF can be grasped accurately with a higher probability. Hence, abnormal combustion in the DPF can be grasped more reliably, and as a result, an abnormal temperature increase in the DPF can be prevented early. Furthermore, an unnecessary operation is not performed when a DPF abnormal combustion causing operation has not occurred, and therefore the thermal efficiency of the diesel engine 10 does not decrease.

Moreover, by resuming the opening control of the intake throttle valve 44 and continuing the late post-injection when the estimated accumulated PM amount is equal to or smaller than the threshold C, the exhaust gas amount can be reduced while suppressing abnormal combustion in the DPF device 52. As a result, the amount of late post-injected fuel can be reduced, enabling a corresponding reduction in oil dilution.

According to the present invention, abnormal combustion in a DPF provided in an aftertreatment system for an internal combustion engine, and more particularly a diesel engine, can be prevented, and as a result, damage to the DPF and thermal deterioration of a catalyst coated on the DPF can be prevented effectively.

The invention claimed is:

1. An exhaust gas treatment method for an internal combustion engine, comprising a collecting step of collecting particulate matter contained in an exhaust gas discharged from the internal combustion engine in a filter, and an active regeneration step of post-injecting a fuel to heat the exhaust gas to a combustion temperature of the particulate matter in a diesel oxidation catalyst so that the particulate matter collected in the filter is burned and removed by the heated exhaust gas, the exhaust gas treatment method comprising:
detecting an exhaust gas temperature at an inlet of the filter during the active regeneration step,
determining whether or not a shift of an operating condition of the internal combustion engine from a high rotation or high load operating condition to a low rotation and low load operating condition including an idling condition occurs within a set time during the active regeneration step;
increasing an exhaust gas flow by performing at least one operation from among fully opening a throttle valve provided in an intake pipe or an exhaust pipe and not reducing a rotation speed during the low load operating condition to or below a set value, when the exhaust gas temperature at the inlet of the filter is determined to equal or exceed the combustion temperature of the particulate matter during the active regeneration step and the operating condition of the internal combustion engine is determined to shift within the set time; and
reducing a combustion speed of the particulate matter performed in parallel with increasing the exhaust gas flow by reducing an oxygen concentration of the filter while continuing the post-injection as is.

2. The exhaust gas treatment method for an internal combustion engine according to claim 1, wherein said determining whether or not the shift occurs includes determining the operating condition of the internal combustion engine based on an engine rotation speed in combination with either an engine load signal or a fuel injection amount signal.

3. The exhaust gas treatment method for an internal combustion engine according to claim 2, wherein the set time is within a range of 10 seconds.

4. The exhaust gas treatment method for an internal combustion engine according to claim 3, further comprising determining an estimated accumulation amount of the particulate matter,
wherein said increasing the exhaust gas flow and said reducing the combustion speed of the particulate matter are performed, when: i) the exhaust gas temperature at the inlet of the filter is determined to equal or exceed the combustion temperature of the particulate matter; ii) the operating condition of the internal combustion engine is determined to shift within the set time; and iii) the estimated accumulation amount exceeds a threshold.

5. The exhaust gas treatment method for an internal combustion engine according to claim 4, wherein:
said increasing the exhaust gas flow includes at least said fully opening the throttle valve, and
controlling an opening of the throttle valve is resumed when the estimated accumulation amount falls to or below the threshold.

6. The exhaust gas treatment method for an internal combustion engine according to claim 5, wherein said controlling the opening of the throttle valve is resumed and the post-injection is continued when the estimated accumulation amount falls to or below the threshold.

7. The exhaust gas treatment method for an internal combustion engine according to claim 6, further comprising detecting a temperature of the exhaust gas passing through the diesel oxidation catalyst,
wherein after said increasing the exhaust gas flow and said reducing the combustion speed of the particulate matter, the active regeneration step is interrupted when the temperature of the exhaust gas is equal to or below an activation temperature of the diesel oxidation catalyst.

8. The exhaust gas treatment method for an internal combustion engine according to claim 1, wherein the set time is within a range of 10 seconds.

9. The exhaust gas treatment method for an internal combustion engine according to claim 1, further comprising determining an estimated accumulation amount of the particulate matter, wherein said increasing the exhaust gas flow and said reducing the combustion speed of the particulate matter are performed, when: i) the exhaust gas temperature at the inlet of the filter is determined to equal or exceed the combustion temperature of the particulate matter; ii) the operating condition of the internal combustion engine is determined to shift within the set time; and iii) the estimated accumulation amount exceeds a threshold.

10. The exhaust gas treatment method for an internal combustion engine according to claim 1, further comprising detecting a temperature of the exhaust gas passing through the diesel oxidation catalyst, wherein after said increasing the exhaust gas flow and said reducing the combustion speed of the particulate matter, the active regeneration step is interrupted when the temperature of the exhaust gas is equal to or below an activation temperature of the diesel oxidation catalyst.

11. An exhaust gas treatment device for an internal combustion engine, in which a diesel oxidation catalyst and a filter are provided in an exhaust pipe of the internal combustion engine, particulate matter contained in an exhaust gas is collected in the filter, and a fuel is post-injected to heat the exhaust gas to a combustion temperature of the particulate matter in the diesel oxidation catalyst so that the particulate matter collected in the filter is burned and removed by the heated exhaust gas, the exhaust gas treatment device comprising:
a throttle valve provided in an intake pipe or the exhaust pipe;
a temperature sensor configured to detect an exhaust gas temperature at an inlet of the filter; and
a controller configured to determine whether or not a shift in an operating condition of the internal combustion engine from a high rotation or high load operating condition to a low rotation and low load operating condition including an idling condition occurs within a set time and configured to increase the exhaust gas flow by performing at least one operation from among fully opening the throttle valve and not reducing a rotation speed during the low load operating condition to or below a set value and continue the post-injection as is when the exhaust gas temperature at the inlet of the filter is determined to equal or exceed the combustion temperature of the particulate matter and the operating condition of the internal combustion engine is determined to shift within the set time during the active regeneration step of burning and removing the particulate matter collected in the filter.

12. The exhaust gas treatment device for an internal combustion engine according to claim 11, wherein the controller is configured to determine whether or not the shift in the operating condition of the internal combustion engine occurs based on an engine rotation speed in combination with either an engine load signal or a fuel injection amount signal.

13. The exhaust gas treatment device for an internal combustion engine according to claim 12, wherein the set time is within a range of 10 seconds.

14. The exhaust gas treatment device for an internal combustion engine according to claim 13, further comprising an estimating unit for estimating an accumulation amount of the particulate matter, wherein the controller configured to perform said increasing the exhaust gas flow and said reducing the combustion speed of the particulate matter when: i) the exhaust gas temperature at the inlet to the filter is determined to equal or exceed the combustion temperature of the particulate matter; ii) the operating condition of the internal combustion engine is determined to shift within the set time; and iii) the accumulation amount of the particulate matter estimated by the controller exceeds a threshold.

15. The exhaust gas treatment device for an internal combustion engine according to claim 14, wherein the controller is configured to at least fully open the throttle valve so as to increase the exhaust gas flow, and wherein the controller is configured to resume controlling an opening of the throttle valve when the estimated accumulation amount falls to or below the threshold.

16. The exhaust gas treatment device for an internal combustion engine according to claim 15, wherein the controller is configured to resume controlling an opening of the throttle valve and continue the post-injection when the estimated accumulation amount falls to or below the threshold.

17. The exhaust gas treatment device for an internal combustion engine according to claim 16, further comprising an exhaust gas temperature sensor configured to detect a temperature of the exhaust gas passing through the diesel oxidation catalyst, wherein, the controller is configured to interrupt the active regeneration step when the temperature of the exhaust gas is equal to or below an activation temperature of the diesel oxidation catalyst after said increasing the exhaust gas flow and said reducing the combustion speed of the particulate matter.

18. The exhaust gas treatment device for an internal combustion engine according to claim 11, wherein the set time is within a range of 10 seconds.

19. The exhaust gas treatment device for an internal combustion engine according to claim 11, further comprising an estimating unit for estimating an accumulation amount of the particulate matter, wherein the controller is configured to perform said increasing the exhaust gas flow and said reducing the combustion speed of the particulate matter when: i) the exhaust gas temperature at the inlet to the filter is determined to equal or exceed the combustion temperature of the particulate matter; ii) the operating condition of the internal combustion engine is determined to shift within the set time; and iii) the accumulation amount of the particulate matter estimated by the controller exceeds a threshold.

20. The exhaust gas treatment device for an internal combustion engine according to claim 11, further comprising an exhaust gas temperature sensor configured to detect a temperature of the exhaust gas passing through the diesel oxidation catalyst, wherein, the controller is configured to interrupt the active regeneration step when the temperature of the exhaust gas is equal to or below an activation temperature of the diesel oxidation catalyst after said increasing the exhaust gas flow and said reducing the combustion speed of the particulate matter.

* * * * *